US012713283B2

(12) United States Patent
Nakazato et al.

(10) Patent No.: US 12,713,283 B2
(45) Date of Patent: Aug. 18, 2026

(54) APPARATUS AND METHOD FOR DISTRIBUTED DATA PROCESSING IN SHARED RAN

(71) Applicant: RAKUTEN MOBILE, INC., Tokyo (JP)

(72) Inventors: Jin Nakazato, Tokyo (JP); Saki Tanaka, Tokyo (JP); Haruka Horiuchi, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 491 days.

(21) Appl. No.: 18/040,069

(22) PCT Filed: May 31, 2022

(86) PCT No.: PCT/JP2022/022221

§ 371 (c)(1),
(2) Date: Jan. 31, 2023

(87) PCT Pub. No.: WO2023/233553

PCT Pub. Date: Dec. 7, 2023

(65) Prior Publication Data

US 2024/0251283 A1 Jul. 25, 2024

(51) Int. Cl.
*H04W 28/02* (2009.01)
*H04W 16/04* (2009.01)
*H04W 28/08* (2023.01)

(52) U.S. Cl.
CPC ....... *H04W 28/0268* (2013.01); *H04W 16/04* (2013.01); *H04W 28/0967* (2020.05); *H04W 28/0992* (2020.05)

(58) Field of Classification Search
None
See application file for complete search history.

(56) References Cited

U.S. PATENT DOCUMENTS

2019/0335366 A1* 10/2019 Jin ........................ H04W 48/18
2023/0189077 A1* 6/2023 Kwon .................. H04W 28/16 370/328
2024/0251296 A1* 7/2024 Nakazato ............. H04W 36/22

OTHER PUBLICATIONS

"3rd Generation Partnership Project; Technical Specification Group Services and System Aspects; Network Sharing; Architecture and functional description (Release 16)", 3GPP TS 23.251 V16.0.0 (Jul. 2020), Technical Specification, 39 pages, https://www.3gpp.org/ftp/Specs/archive/23_series/23.251/23251-g00.zip.

* cited by examiner

*Primary Examiner* — Kouroush Mohebbi
(74) *Attorney, Agent, or Firm* — Sughrue Mion, PLLC

(57) ABSTRACT

A management apparatus of a Radio Access Network (RAN) that is shared by a plurality of operators, wherein the RAN comprises: a Central Unit (CU); a first Distributed Unit (DU) that is communicably connected to the CU; a second DU that is communicably connected to the CU; and a Radio Unit (RU) that is communicably connected to the first DU and the second DU, wherein the management apparatus comprises a processor that executes transmission of instructions to the CU, the first DU, and the second DU to cause the second DU to process, among data to be processed at the first DU for the RU, at least a portion of data for a specific equipment (UE) that is communicably connected to the RU.

8 Claims, 12 Drawing Sheets

300−1
UE#1
Best−Effort
230−1
RU#1
300−2
UE#2
Guarantee
230−2
RU#2
220−1
DU#1
220−2
DU#2
210
CU
400
MEC
(UPF)
126
DB
100
Management
Apparatus
1101
Acquirement/
configuration
of processing
capabilities
and SLAs
[periodical]
Determination/monitoring (SLAs)
at application level
1201
Configuration of M−Plane,
emission of radio waves
Establish sessions in
RU#1⇔DU#1+ DU#2
RU#2⇔DU#1+ DU#2

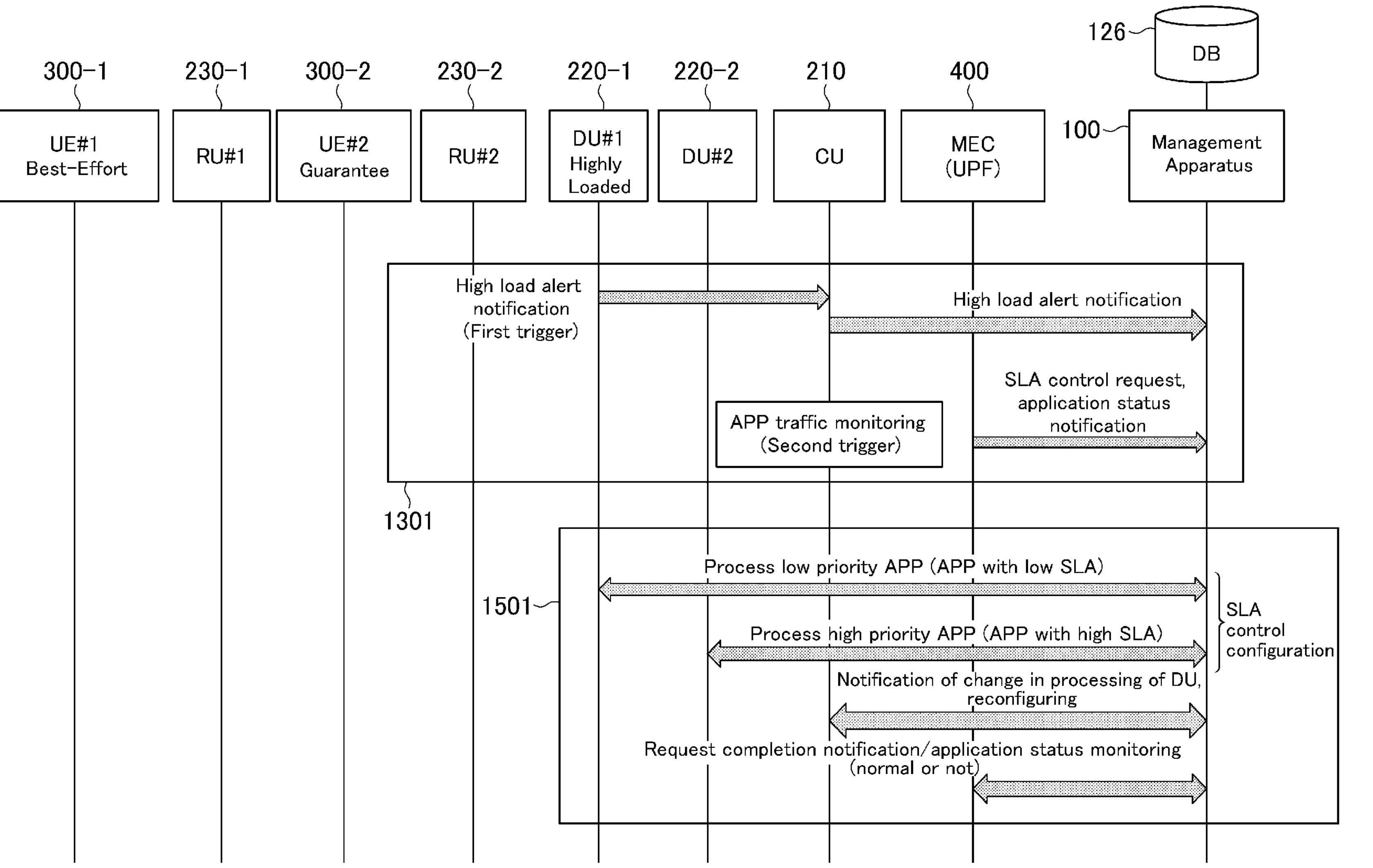
Fig. 7
126
DB
300-1
230-1
300-2
230-2
220-1
220-2
210
400
100
UE#1
Best-Effort
RU#1
UE#2
Guarantee
RU#2
DU#1
Highly
Loaded
DU#2
CU
MEC
(UPF)
Management
Apparatus
High load alert
notification
(First trigger)
High load alert notification
SLA control request,
application status
notification
APP traffic monitoring
(Second trigger)
1301
Process low priority APP (APP with low SLA)
1501
Process high priority APP (APP with high SLA)
SLA
control
configuration
Notification of change in processing of DU,
reconfiguring
Request completion notification/application status monitoring
(normal or not)

100
Management Apparatus
450
Monitoring Apparatus
210
CU
220-2
DU#2
220-1
DU#1 Highly Loaded
230-2
RU#2
300-2
UE#2 Guarantee
230-1
RU#1
300-1
UE#1 Best-Effort
High load alert notification
High load alert notification
SLA control request, load distribution notification
1301
Processing distribution instruction
Changing frequency allocations
1501

APPARATUS AND METHOD FOR DISTRIBUTED DATA PROCESSING IN SHARED RAN

CROSS REFERENCE TO RELATED APPLICATIONS

This application is a National Stage of International Application No. PCT/JP2022/022221 filed May 31, 2022.

TECHNICAL FIELD

The present disclosure relates to a Radio Access Network (RAN) management apparatus for distributing data processing in DUs of a shared RAN, and a RAN management method.

BACKGROUND

Future mobile communication networks are premised on the ubiquitous society. In order to satisfy the requirements of Enhanced Mobile Broadband (eMBB), Ultra-Reliable and Low Latency Communications (URLLC), and Massive Machine Type Communication (mMTC), the installation of a larger number of radios than ever is required. Physical space is finite, is subject to many restrictions, and has a lot of problems such as scenery becoming spoiled, thus efficient use of space is required.

Therefore, there is a concept of Radio Access Network (RAN) sharing, which makes it possible to aggregate multiple frequencies and multiple operators (providers) with a single radio.

Non-Patent Document 1 discloses a Gateway Core Network (GWCN) configuration in which operators operate a Core Network (CN) and multiple operators share a RAN and a gateway between the RAN and the CN.

Non-Patent Document 1 further discloses a Multi-Operator Core Network (MOCN) in which operators operate a CN and a gateway between a RAN and the CN and multiple operators share the RAN.

Base stations of the RAN may include a Central Unit (CU), one or more Distributed Units (DUs) connected to the CU, and one or more Radio Units (RUs) connected to the DUs.

In one form of RAN sharing, regarding antennas in the RUs, emitted (or incoming) frequencies are separate for each operator.

In RAN sharing, current network services provided by operators are often a best-effort method, which defines effort values of a throughput.

Moreover, in RAN sharing, there are no known means for guaranteeing service quality (a guarantee method), which secures a lower limit of throughput even during congestion and the like.

CITATION LIST

Non-Patent Literature

Non-Patent Document 1: 3GPP TS 23.251 (2020-07) (https://www.3gpp.org/ftp/Specs/archive/23_series/23.251/23251-g00.zip)

SUMMARY OF INVENTION

Technical Problem

As described above, RAN sharing by a plurality of operators is advantageous from the perspective of effective use, etc., of space for installing base stations.

Communication with User Equipment (UEs) can strain usage resources of base stations (especially DUs) that are being shared. In such cases, it has been difficult to secure a lower limit of throughput for the UEs of users that have entered into Service Level Agreements (SLA) with operators.

The present disclosure was made in view of the circumstances described above, and an objective thereof is to provide a technology for increasing throughput for UEs even when usage resources of DUs that are being shared are strained.

Solution to Problem

One aspect of a Radio Access Network (RAN) management apparatus according to the present disclosure is a management apparatus for a RAN that is shared by a plurality of operators.

The RAN includes a Central Unit (CU), a first Distributed Unit (DU) that is communicably connected to the CU, a second DU that is communicably connected to the CU, and a Radio Unit (RU) that is communicably connected to the first DU and the second DU.

The management apparatus includes a processor that executes transmission of instructions to the CU, the first DU, and the second DU to cause the second DU to process, among data to be processed at the first DU for the RU, at least a portion of the data for a specific User Equipment (UE) that is communicably connected to the RU.

The specific UE may be a UE that has entered into a guarantee type Service Level Agreement (SLA) with one of the plurality of operators.

The instructions may be transmitted when a resource usage rate of the first DU exceeds a predetermined first threshold or when traffic being monitored in the RAN exceeds a predetermined second threshold.

The portion of the data to be processed at the second DU may be determined by the type of data for the specific UE.

The type of the data for the specific UE may be defined for each application.

The portion of the data to be processed at the second DU may be a fixed percentage portion of the data for the specific UE.

The fixed percentage portion may be selected in resource block units.

One aspect of a method for managing a Radio Access Network (RAN) according to the present disclosure is a method for managing a RAN that is shared by a plurality of operators.

The management method includes providing the RAN, wherein the RAN includes a Central Unit (CU), a first Distributed Unit (DU) that is communicably connected to the CU, a second DU that is communicably connected to the CU, and a Radio Unit (RU) that is communicably connected to the first DU and the second DU.

The management method further includes instructing the CU, the first DU, and the second DU to cause the second DU to process, among data to be processed at the first DU for the RU, at least a portion of the data for a specific User Equipment (UE) that is communicably connected to the RU.

One aspect of a radio communication system according to the present disclosure includes a Radio Access Network (RAN) that is shared by a plurality of operators, and a management apparatus for the RAN.

The RAN includes a Central Unit (CU), a first Distributed Unit (DU) that is communicably connected to the CU, a second DU that is communicably connected to the CU, and a Radio Unit (RU) that is communicably connected to the first DU and the second DU.

The management apparatus includes a processor that executes instructing the CU, the first DU, and the second DU to cause the second DU to process, among data to be processed at the first DU for the RU, at least a portion of the data for a specific User Equipment (UE) that is communicably connected to the RU.

BRIEF DESCRIPTION OF DRAWINGS

FIG. 7 is a schematic diagram for describing an example of a procedure of a processing distribution of a DU according to one or more embodiments.

DESCRIPTION OF EMBODIMENTS

Hereinafter, one embodiment of the present disclosure will be explained in detail with reference to the drawings.

Figure 1:
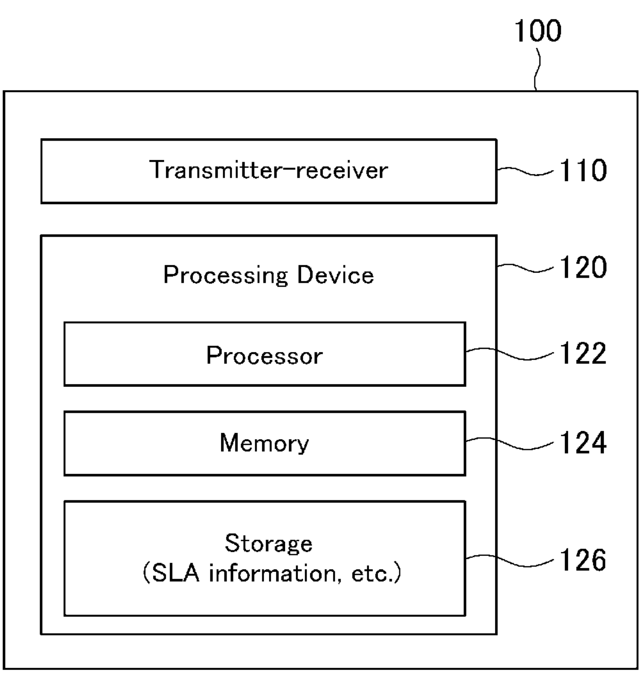
FIG. 1 is a diagram illustrating an example of a management apparatus according to one or more embodiments.

FIG. 1 is a diagram illustrating an example of a management apparatus 100 according to one or more embodiments. The management apparatus 100 is a Radio Access Network (RAN) management apparatus that controls the RAN.

Before describing the management apparatus 100 according to one or more embodiments, the RAN controlled by the management apparatus 100 will be described.

A RAN in an O-RAN compliant network system has base stations that include Central Units (CUs), Distributed Units (DUs), and Radio Units (RUs). The RAN includes one or more CUs. Each CU has one or more DUs communicably connected thereto. Each DU has one or more RUs connected thereto. RUs comprise antennas and communicate with User Equipment (UEs).

Hereinafter, to simplify the explanation, downlinks to UEs are exclusively considered. In particular, data transmission from a CU to a DU, from the DU to an RU, and then from the RU to a UE, and data processing at the DU and the RU will be described in detail. However, uplinks are also included within the scope of the present disclosure.

Figure 2:
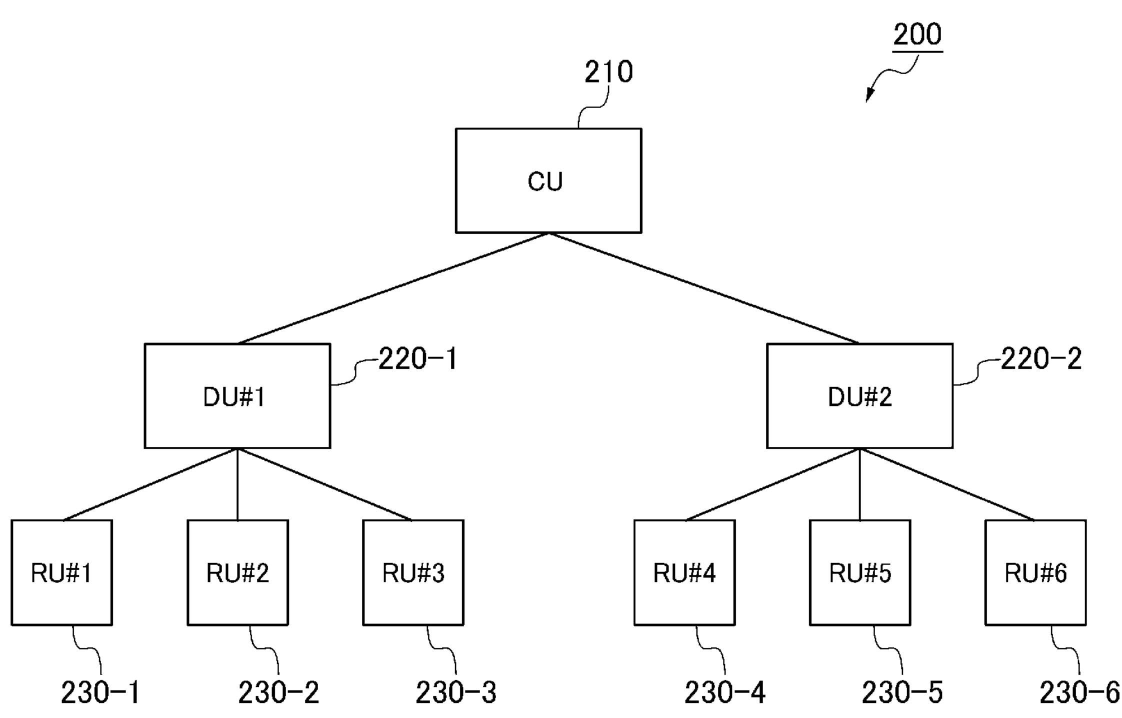
FIG. 2 is a diagram illustrating an example of a configuration of a RAN in an O-RAN compliant network system.

FIG. 2 is a diagram illustrating an example of a configuration of a RAN in an O-RAN compliant network system. FIG. 2 shows that a RAN 200 includes one CU 210. The CU 210 is communicably connected to a DU 220-1 (also referred to as "DU #1") and a DU 220-2 (also referred to as "DU #2"). The DU 220-1 is communicably coupled to an RU 230-1, an RU 230-2, and an RU 230-3 (also referred to as "RU #1", "RU #2", and "RU #3", respectively). The DU 220-2 is communicably coupled to an RU 230-4, an RU 230-5, and an RU 230-6 (also referred to as "RU #4", "RU #5", and "RU #6", respectively).

Hereinafter, one or more DUs (DU #1 and DU #2 in FIG. 2) will be collectively referred to as DUs 220. In addition, one or more RUs (six RUs from RU #1 to RU #6 in FIG. 2) will be collectively referred to as an RUs 230.

A virtualized CU (vCU) can be configured by virtualizing the functions of the CU 210. Virtualized DUs (vDUs) can be configured by virtualizing the functions of (one or more of) the DUs 220. Virtualization allows a general-purpose server to be used instead of a dedicated server, and a RAN to be configured inexpensively and flexibly.

Hereinafter, a "CU" may indicate a "vCU" on the premise of virtualization. In addition, a "DU" may indicate a "vDU".

Figure 3:
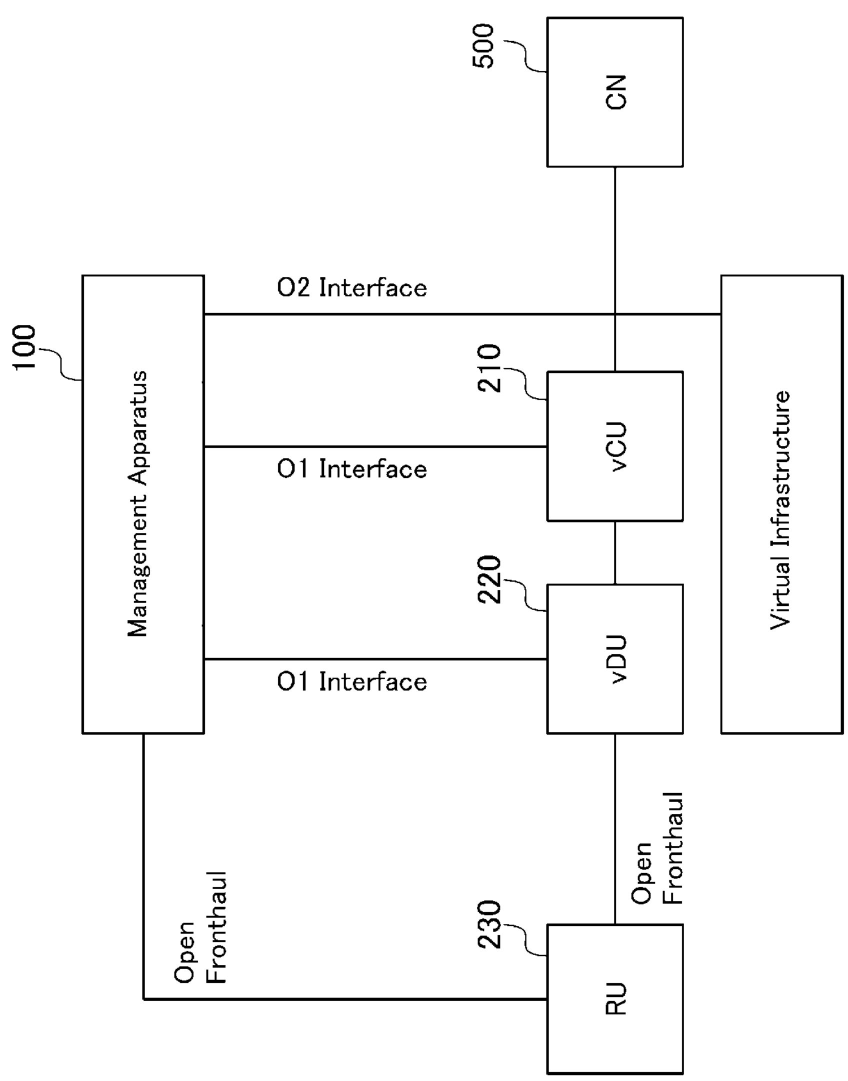
FIG. 3 is a diagram illustrating an example of a connection between a management apparatus and a RAN in an O-RAN compliant network system.

FIG. 3 is a diagram illustrating an example of a connection between the management apparatus 100 and a RAN in an O-RAN compliant network system.

The management apparatus 100 may be, for example, a RAN Intelligent Controller (RIC) defined by an O-RAN Alliance. The management apparatus 100 may be, in particular, a real-time RIC. The management apparatus 100 and a vCU 210 of the RAN are connected with an O1 interface. The management apparatus 100 and a vDU 220 of the RAN are connected with an O1 interface. The management apparatus 100 and a virtual infrastructure on which the vCU 210 and the vDU 220 are configured may be connected with an O2 interface.

As described below, the management apparatus may be communicably connected to a Multi-access Edge Computing (MEC) server and/or a monitoring server for monitoring the RAN.

Moreover, the vCU 210 is connected to a Core Network (CN) 500.

The RAN 200 of FIG. 2 may be a RAN that is shared by a plurality of operators (mobile network operators).

The configuration of FIG. 3 may be a Gateway Core Network (GWCN) configuration in which a plurality of operators shares a RAN and a gateway (not shown) between the RAN and a CN 500, and in which each operator operates the CN 500.

Alternatively, the configuration of FIG. 3 may be a Multi-Operator Core Network (MOCN) configuration in which a plurality of operators shares a RAN, and in which each operator operates a CN 500 and a gateway (not shown) between the RAN and the CN 500.

Each UE user enters into an agreement with an operator specific to that UE to receive communication service. Note that a user may enter into agreements with two or more operators for one UE to receive communication services. However, in the following description, the same user can be considered to have entered into an agreement for two UEs with one operator specific to each of the two UEs. Thus, even if each UE has an agreement with a specific operator, generality is not lost, and the present disclosure is applicable.

When a user of a UE receives communication service from an operator specific to that UE, the user can enter into an agreement for a service level thereof. Hereinafter, an abbreviation "SLA" is used also to mean an agreed service level agreement. The SLA has a guarantee type and a best-effort type.

The guarantee type secures a lower limit of throughput even during congestion.

The best-effort type defines effort values of throughput.

In the present disclosure, the SLA of the UEs will either be the guarantee type or the best-effort type. The UEs are also referred to as a "guarantee type UE" or a "best-effort type UE" depending on the SLA the UE.

Suppose that the number of the operators sharing the RAN is represented by K. K is an integer greater than or equal to 1. Each operator is numbered from 1 to K, and is referred to as an "i-th operator" (i is an integer from 1 to K, inclusive).

For example, if the RAN is not shared by multiple operators, then K=1. Moreover, for example, if the RAN is shared between Operator Company A and Operator Company B, then K=2, and thus the first operator can be Company A and the second operator can be Company B.

Returning to FIG. 1, the management apparatus 100 according to the present embodiment will be explained. The management apparatus 100 includes a transmitter-receiver 110 and a processing device 120. The management apparatus 100 may include components that are not shown in FIG. 1.

The processing device 120 includes a processor 122, a memory 124, and a storage 126. The processor 122 may comprise any number of one or more processors. The memory 124 may comprise any number of one or more memories.

The transmitter-receiver 110 is communicably connected to the CU and the DUs. The transmitter-receiver 110 exchanges data with the CU and with the DUs. The transmitter-receiver 110 can also be communicably connected to a MEC server and/or a monitoring server described below.

The processing device 120 is connected to the transmitter-receiver 110. The processing device 120 can control the RAN (in particular, the CU and the DUs) connected via the transmitter-receiver 110.

The functions of the processor 120 may be provided to software using the processor 122 and the memory 124.

The storage 126 may all be disposed inside the management apparatus 100 or at least a portion thereof may be disposed outside the management apparatus 100.

The storage 126 may comprise a database that stores information related to the quality of communication services that operators provide to respective UEs, for one or more UEs connected to the RAN. The database is described below.

Details of the control of the RAN by the management apparatus 100 according to the present embodiment will be described below.

Figure 4:
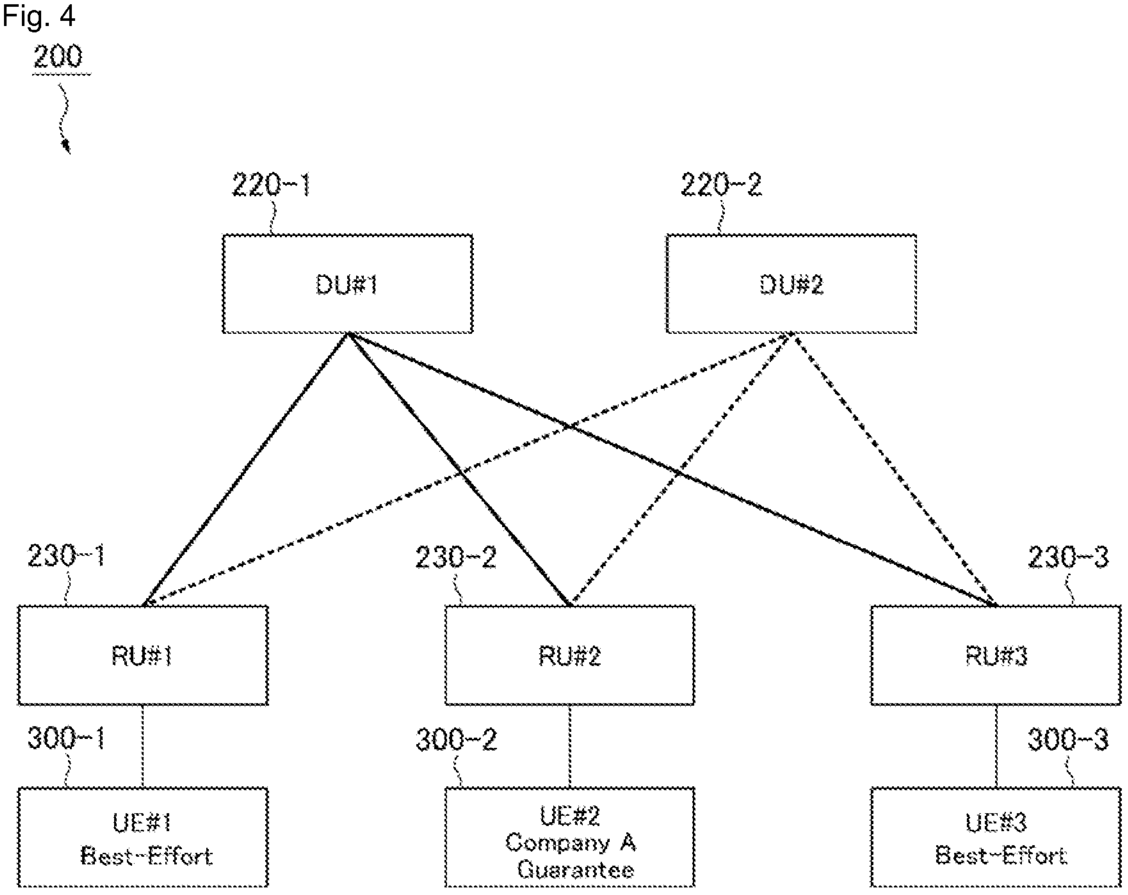
FIG. 4 is a diagram illustrating an example of a RAN to which a management apparatus and a management method according to one or more embodiments is applied.

FIG. 4 is a diagram illustrating an example of RAN 200 to which a management apparatus and a management method according to one or more embodiments is applied.

The illustration of a CU is omitted in FIG. 4. The RAN 200 has a DU #1 and a DU #2. The DU #1 has an RU #1, an RU #2, and an RU #3 communicably connected thereto. In addition, the DU #2 also has the RU #1, the RU #2, and the RU #3 communicably connected thereto.

A case in which there are two DUs and three RUs is merely one example, and there may be two or more DUs and there may be one or more RUs.

Two DUs are communicably connected to one RU. A Hierarchical Model of the O-RAN manages one RU with one or more DUs.

The RAN 200 is shared by one or more operators. The RAN 200 may be a GWCN configuration or a MOCN configuration.

Hereinafter, in order to simplify the explanation, there follows a detailed description of a case where the number of operators K is an integer greater than or equal to 1 and the first operator (often referred to as "Company A") provides the users only the guarantee type communication service. Other operators provide the users only the best-effort type communication service.

For example, the first operator may provide communication service by having each user select a guarantee type or a best-effort type. The present disclosure may be applied to other more general cases, provided that the necessary changes are also made to interpretations.

Referring back to FIG. 4, the RU #1, the RU #2, and the RU #3 are each communicably connected to (have a session established with) both the DU #1 and the DU #2.

The best-effort type UE #1 and UE #3 (see reference numbers 300-1 and 300-3 in FIG. 4) are connected to the RU #1 and the RU #3, respectively. The guarantee type UE #2 (see reference number 300-2 in FIG. 4) is connected to the RU #2.

Each RU being connected to only one UE is merely one example, and each RU can have any number of UEs connected thereto and there may be an RU with no UEs connected thereto.

Only the DU #1 is used for communication with the best-effort type UEs. For example, when the best-effort type UE #1 is in communication with the RU #1, data to the RU #1 for the UE #1 is transmitted from the CU via the DU #1 instead of the DU #2.

Moreover, when the processing capacity of the DU #1 has not decreased (referred to as a "Normal Time" of the DU #1), only the DU #1 is used to communicate also with the guarantee type UE #2. For example, when the guarantee type UE #2 is in communication with the RU #2, at a Normal Time, data to the RU #2 is transmitted from the CU via the DU #1 instead of the DU #2.

In other words, the DU #1 is a DU that is shared by one or more operators and that processes not only guarantee type UE data but also best-effort type UE data. If the amount of the data to be processed at the DU #1 increases (referred to as a "communication congestion" in the DU #1), the processing capacity of the DU #1 decreases, and thus it may not be possible to fulfill the guarantee type SLAs of each company.

In the present disclosure, the management apparatus transmits instructions to the CU, the DU #1, and the DU #2 to cause the DU #2 to process at least a portion of data for a specific UE that is communicably connected to an RU among data to be processed at the DU #1 for the RU.

Transferring processing at one DU to another DU is referred to as "processing distribution".

A processing distribution according to the present disclosure may be initiated, for example, when the processing capacity of the DU #1 decreases and/or when communication congestion occurs.

A specific UE is, for example, a UE in which a user has entered into a guarantee type SLA with one of a plurality of operators. The specific UE may be one UE or multiple UEs.

In FIG. 4, a portion of data processing at the DU #1 for the guarantee type UE #2 is performed at the DU #2 when communication congestion occurs.

Operators, excluding one operator from the plurality of operators, may enter into best-effort type SLAs with the users. Regarding the data for the best-effort type UE #1, only the DU #1 is used at all times.

In particular, the RU #2 to which the guarantee type UE #2 is connected may also have a best-effort type UE (referred to as UE #4) connected thereto. Even when the portion of the data processing for the guarantee type UE #2 is transferred to the DU #2, only the DU #1 is used at all times for data processing for the UE #4.

As a result thereof, the processing of the DU #1 for the specific UE (especially the guarantee type UEs) is distributed to the DU #2, thereby ensuring the lower limit of the throughput of the UE.

Generally, operators will be able to fulfill the Service Level Agreements. Moreover, the load of the DU #1 is reduced, and the processing capacity of the DU #1 is recovered.

The DU #2 for fulfilling the guarantee type SLA holds sufficient processing resources.

Several examples are described below to explain procedures of determining a portion of processing to be transferred from a DU #1 to a DU #2 among data for a guarantee type UE #2, and transferring the processing of the determined portion from the DU #1 to the DU #2.

(Processing Distribution According to Data Type)

Figure 5:
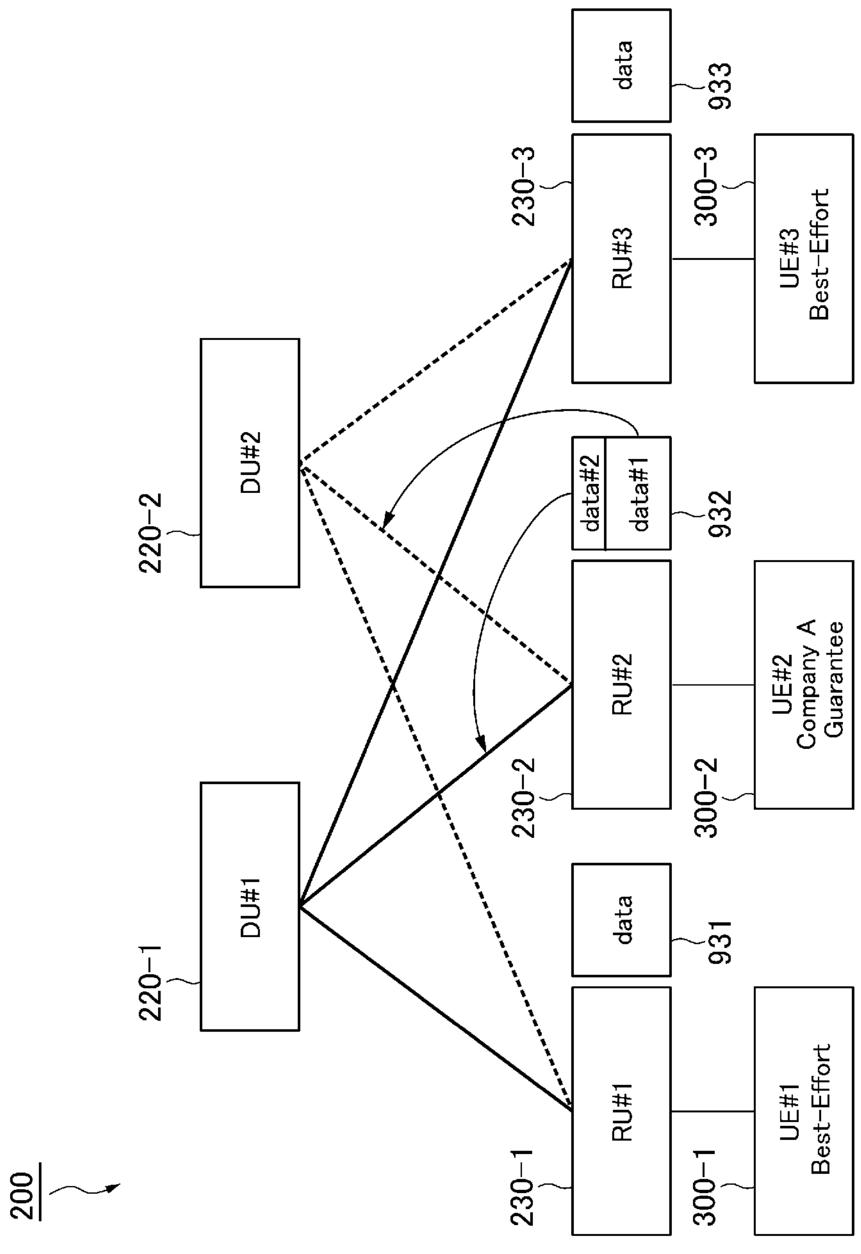
FIG. 5 is a schematic diagram illustrating an example of a processing distribution of a DU according to one or more embodiments.

FIG. 5 is a schematic diagram illustrating an example of a processing distribution of a DU according to one or more embodiments.

Referring to FIG. 5, an example of distributing processing at a DU according to a type of data will be described. The connections between the DU #1/DU #2 and the RU #1/RU #2/RU #3 in FIG. 5 is the same as in FIG. 4, so a description thereof will be omitted.

Moreover, the numbers of the DUs, the RUs, guarantee type UEs, and best-effort type UEs are not limited to those illustrated in FIG. 5, and there is no particular limitation on the number thereof. In particular, regarding the UEs, any number of UEs may be connected to one RU. In addition, there may also be RUs that have no UEs connect thereto.

The best-effort type UE #1 and UE #3 are connected to the RU #1 and the RU #3, respectively. Data processed for the UE #1 and the UE #3 in the RU #1 and the RU #3 are data 931 and data 933, respectively.

Guarantee type UE #2*s* are each connected to the RU #2. Data processed for the UE #2 in the RU #2 is data 932.

Only the DU #1 is used to process data for the best-effort type UEs. In other words, the data 931 and the data 933 for the UE #1 and the UE #3 are transmitted from the DU #1 to the RU #1 and the RU #3, respectively.

Even when processing data for guarantee type UEs, only the DU #1 is used in the Normal Time. In other words, in the Normal Time, the data 932 is transmitted from the DU #1 to the RU #2.

During the Normal Time, now suppose that the processing capacity of the DU #1 has decreased due to processing the data 931, the data 932, and the data 933. Accordingly, a portion of the processing of the data 932 at the DU #1 for the guarantee type UE #2 is performed at the DU #2.

As a result thereof, even when the processing capacity of the DU #1 is decreasing, such as in a time of congestion, the lower limit of the throughput can be secured for the guarantee type UE.

Among the data for the guarantee type UE, the portion of the processing that is to be transferred from the DU #1 to the DU #2 can be determined by the type (category) of data to be processed. As a result thereof, it may be possible to fulfill the SLAs with data units that are categorized into types.

The data 932 for the guarantee type UE #2 in the RU #2 comprises first data (shown as data #1 in FIG. 5) and second data (shown as data #2 in FIG. 5), which can be categorized by type. The types of the first data and the second data are a first type and a second type, which are distinguishable from each other.

For the data 932 for the guarantee type UE #2, the processing of the first data is transferred to the DU #2. The second data is processed at the DU #1.

The types of data may be stored in a database. In particular, the types of data may be stored in the storage 126 of the management apparatus 100 in FIG. 1. A type of a data for which processing is to be distributed may be determined by machine learning from past trends of the users or the UEs. In addition, data placed in the MEC may be a type of data that is to be processed at the DU #2.

In particular, the type of data used in determining whether or not to distribute processing can be determined for each application. As a result thereof, it may be possible to fulfill SLAs for each application.

In other words, communication services are classified according to the applications in the UEs, and the type used to judge whether or not to distribute processing for data (content) handled by each application is determined. The type used to determine whether or not to distribute processing can be determined based on priority.

The priority or the type of data (content) for each application may be stored in the database. In particular, the priority or the type of data (content) may be stored in the storage 126 of the management apparatus 100 in FIG. 1.

A further specific example will be described with reference to FIG. 5. As in FIG. 4, the guarantee type UE #2 of Company A is connected to the RU #2. Although the RU #2 is connected to the DU #1 and the DU #2, the data for the UE #2 is processed only at the DU #1 in the Normal Time. In particular, the UE #2 receives movie distributions and advertising video distributions via the RU #2 as a guarantee type communication service.

The movies and the advertising videos are played on a video viewing application of the UE. For this reason, the movies and the advertising videos are related to the same application. On the other hand, the movies or the advertising videos played on the video viewing application and, for example, e-mails handled in an e-mail sending/receiving application are distinguished for each application.

Suppose that the movies have a high priority for processing and the advertising videos have a low priority for processing. Processing of the movie data (data #1 in FIG. 5) is distributed to the DU #2 and the advertising video data (data #2 in FIG. 5) is processed at the DU #1.

Figure 6:
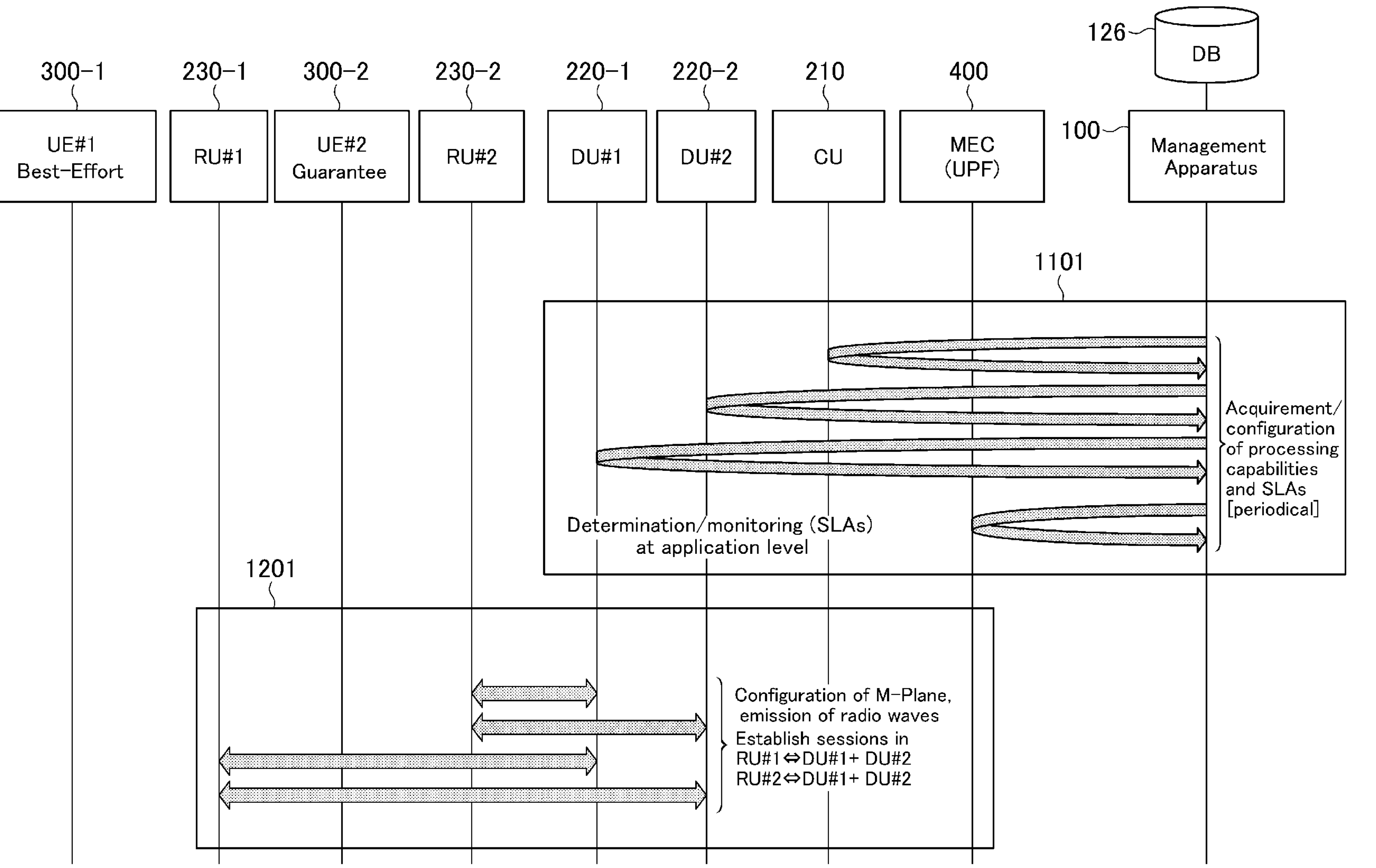
FIG. 6 is a schematic diagram for describing an example of a procedure up to a processing distribution of a DU according to one or more embodiments.

Referring to FIG. 6, an example of a procedure up to a processing distribution of a DU according to one or more embodiments is described.

FIG. 6 shows a management apparatus 100, a storage 126 connected to or included in the management apparatus 100, a MEC 400, a CU 210, a DU #1, a DU #2, an RU #1, an RU #2, a UE #1, and a UE #2.

In particular, the interconnections of the DU #1, the DU #2, the RU #1, the RU #2, the UE #1, and the UE #2 are the same as in FIG. 4. In FIG. 6, the descriptions of the RU #3 and the UE #3 will be omitted. The DU #1 and the DU #2 are communicably connected to the CU 210.

The enclosure indicated by the reference number 1101 in FIG. 6 indicates an acquisition of processing capacities of the DU #1 and the DU #2 by the management apparatus 100, an acquisition of SLAs (that is, a guarantee type or a best-effort type) of the UEs connected to the DU #1 and the DU #2, and determination or monitoring of a status of fulfillment of the SLAs (in particular, guarantee type SLAs).

Processing capacities can be represented by physical resources such as memories and computing resources such as a usage state of a processor. The processing capacities and the SLAs of the connected UEs may be acquired periodically and stored in the storage 126.

Moreover, the management apparatus 100 can acquire information regarding which RU the guarantee type UE is connected to. The management apparatus 100 may also acquire the connection status of the best-effort type UEs.

The management apparatus 100 may configure the CU 210, the DU #1, the RU #1, and the RU #2 such that processing of data directed to the best-effort type UEs and processing of data directed to the guarantee type UE at the Normal Time are performed at the DU #1.

Further, the management apparatus 100 may optionally acquire the amount of the data being processed at each DU from the MEC 400 for each application using the data. As a result thereof, the management apparatus 100 can monitor the amount of the data being processed at each DU for each application.

This allows determination or monitoring of the status of fulfillment of the SLAs (especially the guaranteed SLAs) at an application level.

The amount of the data being processed at each DU may be periodically acquired and stored in the storage 126.

The enclosure indicated by the reference number 1201 in FIG. 6 illustrates a procedure for configuring an M-Plane (management plane) to emit radio waves. Each of the RU #1 and the RU #2 can establish a session with the DU #1 and the DU #2 (see FIG. 4) to emit radio waves.

Referring to FIG. 7, an example of a procedure for a processing distribution of a DU according to one or more embodiments is described.

FIG. 7 also shows the management apparatus 100, the storage 126 connected to or included in the management apparatus 100, the MEC 400, the CU 210, the DU #1, the DU #2, the RU #1, the RU #2, the UE #1, and the UE #2.

The management apparatus 100 controls the processing distribution of the DUs. Triggers that cause the management apparatus 100 to initiate processing distribution of the DUs includes a first trigger and a second trigger described below (see the enclosure indicated by the reference number 1301 in FIG. 7).

The first trigger indicates that the DU #1 is highly loaded. A highly loaded state of the DU #1 indicates, for example, that among resources of the DU #1, the percentage of the portion of the resources used for processing (referred to as "resource usage rate") exceeds a predetermined first threshold.

The first trigger is notified to the CU 210 as a high load alert of the DU #1 and can also be notified to the management apparatus 100.

The second trigger indicates an increase in traffic. An increase in traffic indicates, for example, that traffic being monitored in the RAN exceeds a predetermined second threshold.

The second trigger can be notified to the management apparatus 100 from the MEC 400 monitoring the traffic for each application. This notification may include a request to control the RAN in order to fulfill the SLA, and the status of the application.

Processing distribution of the DU by the management apparatus 100 can be initiated when at least one of the first trigger and the second trigger is applied.

In particular, initiating processing distribution when both the first trigger and the second trigger are applied can avoid incorrect determination due to a temporary high load or a temporary traffic increase due to, for example, deletion of virtualized DUs.

The management apparatus 100 may optionally further notify the DU #1 of the amount and the type of the data for the guarantee type UEs prior to transmission. As a result thereof, the management apparatus 100 can inquire in advance whether or not processing data for the guarantee type UE at the DU #1 will cause the processing capacity of the DU #1 to become lower than in Normal Time.

Even when the first trigger or the second trigger is applied, if the processing capacity of the DU #1 does not decrease than in Normal Time although the DU #1 processes the data for the guarantee type UEs, processing distribution can be canceled.

As a result thereof, processing distribution can be initiated only when the processing distribution is confirmed to be necessary in view of the data to be transmitted.

Processing distribution of the DU by the management apparatus 100 includes the following operations (see the enclosure indicated by the reference number 1501 in FIG. 7).

The management apparatus 100 notifies the DU #1 of the data to be processed at the DU #1 among the data to be processed for the guarantee type UEs.

The management apparatus 100 notifies the DU #2 of the data to be processed at the DU #2 among the data to be processed for the guarantee type UEs.

For the data to be processed for the guarantee type UEs, whether the DU #1 or the DU #2 processes the data can be determined by the type (priority) of the data to be processed for each application, as described with reference to FIG. 5. This configures the control of the service level in the DU #1 and the DU #2.

The management apparatus 100 instructs the CU 210 to transmit the data to be processed at the DU #2 among the data for the guarantee type UEs to the DU #2. Moreover, the management apparatus 100 instructs the CU 210 to transmit the data to be processed at the DU #1 among the data for the guarantee type UEs to the DU #1. The management apparatus 100 may instruct the CU 210 to transmit the data for the best-effort type UEs to the DU #1.

The management apparatus 100 notifies the MEC 400 that instructions for distributing processing to the DU #1, the DU #2, and the CU 210 have been completed. The management apparatus 100 also instructs the MEC 400 to monitor whether or not the traffic of the data related to the application has returned to normal.

(Processing Distribution of Resource Blocks)

Figure 8:
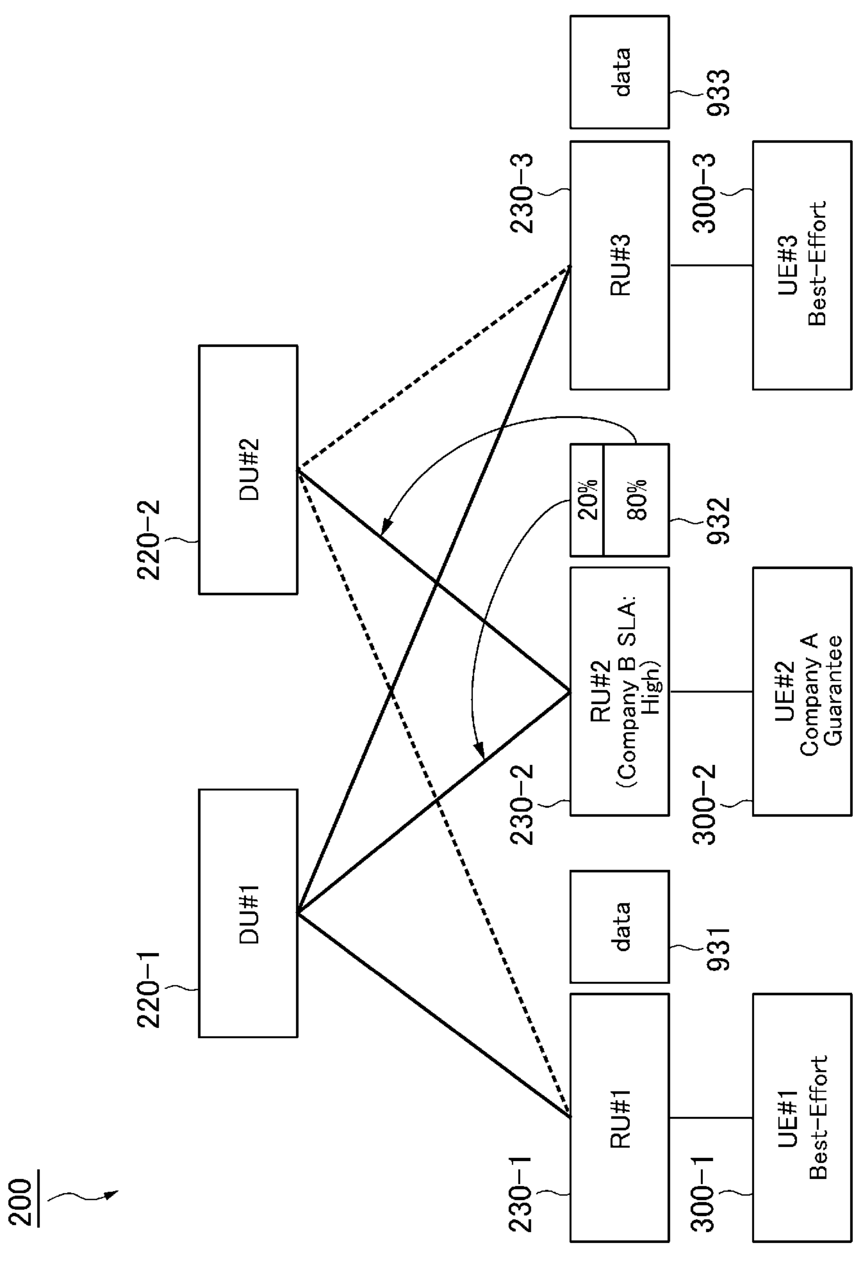
FIG. 8 is a schematic diagram illustrating another example of a processing distribution of a DU according to one or more embodiments.

FIG. 8 is a schematic diagram illustrating another example of a processing distribution of a DU according to one or more embodiments.

Referring to FIG. 8, an example of processing a portion of a fixed percentage of data with another DU will be described.

The connections between the DU #1/DU #2 and the RU #1/RU #2/RU #3 in FIG. 8 are the same as in FIG. 4, so a description thereof will be omitted.

The SLAs for the UE #1 and the UE #3 are best-effort types, and the SLA for the UE #2 is a guarantee type provided by Company A.

Only the DU #1 is used for communications with the best-effort type UEs. That is, data 931 and data 933 for the UE #1 and the UE #3 pass through the DU #1.

Even for communication with a guarantee type UE, only the DU #1 is used in Normal Time. That is, in Normal Time, data 932 passes through the DU #1. However, when the DU #1 is highly loaded and the processing capacity thereof decreases, data processing at the DU #1 for the UE #2 is transferred to the DU #2.

The portion to be transferred to the DU #2 from the processing for the specific UE (guarantee type UE) at the DU #1 is a fixed percentage portion of the data 932 to be processed.

In FIG. 8, for the guarantee type UE #2 in the RU #2, for example, 80% of the processing of the data 932 is distributed to the DU #2. The remaining 20% of the processing of the data 932 is performed at the DU #1.

Thus, the lower limit of the throughput for the UE #2 can be secured while considering the specific amount of the data. Generally, the operator (Company A) can fulfill the Service Level Agreement. Moreover, the load of the DU #1 is reduced, and the processing capacity of the DU #1 is restored.

Selecting a portion of a fixed percentage of data to be processed, which should be transferred to the DU #2, from the processing for the guarantee type UE in the DU #1 can be performed in resource block units.

In other words, in order to reduce the load on the DU #1, the resource blocks that the DU #1 emits radio waves from the RU #2 are reduced, and the reduced resource blocks are compensated by the DU #2.

Figure 9:
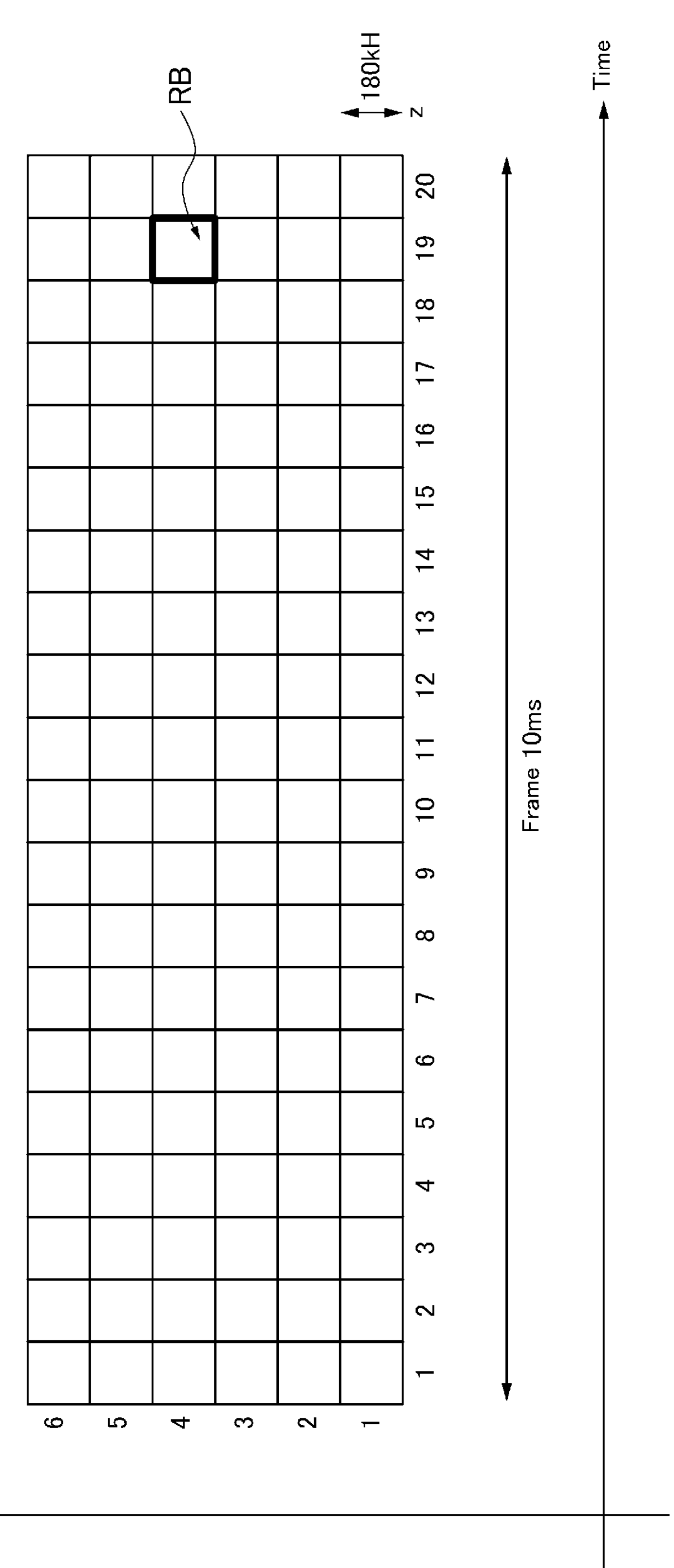
FIG. 9 is a diagram illustrating an example of a resource grid and resource blocks.

FIG. 9 is a diagram illustrating an example of a resource grid and resource blocks. according to one or more embodiments of the present disclosure.

FIG. 9 illustrates a 20×6 resource grid for a time direction and a frequency direction, wherein unit cells of the resource grid are resource blocks. That is, the resource grid of FIG. 9 has 20×6=120 resource blocks. The number of the resource blocks is not limited to 20×6 and may be M×N (where M is an integer greater than or equal to 1 and N is an integer greater than or equal to 1).

Each resource block comprises, for example, one slot (0.5 milliseconds)×12 subcarriers (15×12=180 kHz). The configuration of the resource blocks is also not limited thereto.

In each DU, an allocation (scheduling) of a downlink to an RU in one frame is performed in two resource block units consecutive in the time direction of the resource grid.

Referring to FIG. 8, selecting a fixed percentage portion of data processing to be carried out at the DU #2 will be discussed again.

A downlink from the DU #1 to the RU #2 in Normal Time is performed in a resource grid unit illustrated in FIG. 9. This downlink comprises data for the UE #2.

Therefore, among the resource blocks within the resource grid, for the resource blocks for the data to the UE #2 (for example, the resource blocks directed to the UE #2 among the resource blocks for a Physical Downlink Shared Channel (PDSCH)), a fixed percentage (80% in the example of FIG. 8) of the resource blocks can be selected so as to be processed at the DU #2.

As a result thereof, a fixed percentage portion of the data being processed at the DU #1 (that is, a portion that should be distributed to the DU #2 for processing) can be selected.

Figure 10:
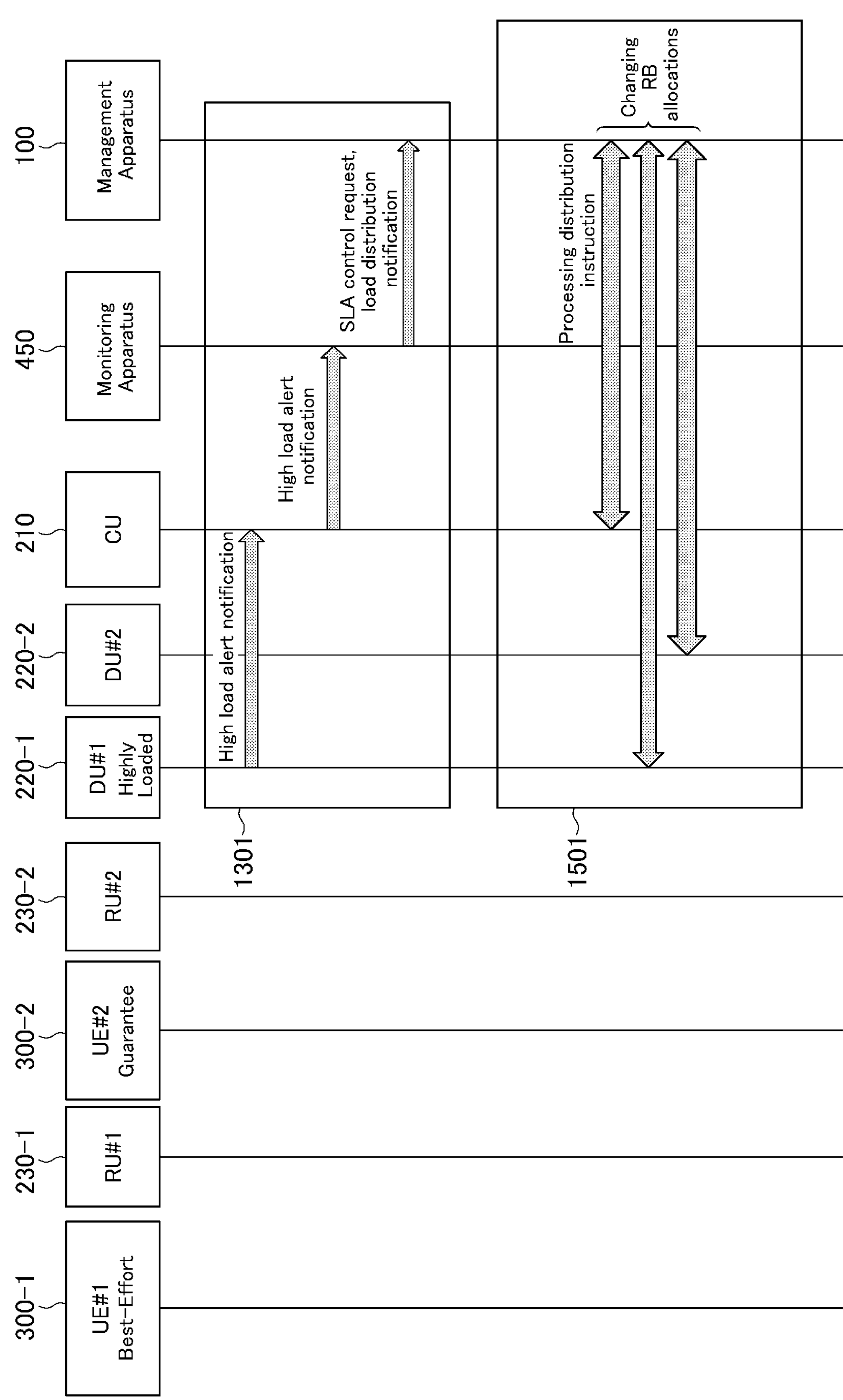
FIG. 10 is a schematic diagram for describing another example of a procedure of a processing distribution of a DU according to one or more embodiments.

Referring to FIG. 10, another example of a procedure for a processing distribution of a DU according to one or more embodiments is described.

FIG. 10, shows a management apparatus 100, a monitoring device 450, a CU 210, a DU #1, a DU #2, an RU #1, an RU #2, a UE #1, and a UE #2 are described. For FIG. 10, too, the interconnections of the DU #1, the DU #2, the RU #1, and the RU #2 are the same as in FIG. 4.

The DU #1 and the DU #2 are communicably connected to the CU 210. In addition, the best-effort type UE #1 and the guarantee type UE #2 are communicably connected to the RU #1 and the RU #2, respectively.

The monitoring device 450 is communicably coupled to at least the CU 210 and the management apparatus 100.

Before the procedure of FIG. 10, the procedure up to the processing distribution of the DUs (except for the procedure related to the MEC 400 of FIG. 6) is performed, as described with reference to FIG. 6.

When the DU #1 is highly loaded, a high load alert is notified from the DU #1 to the CU 210. The high load alert is also notified from the CU 210 to the monitoring device 450.

The monitoring device 450 has information regarding SLAs (a best-effort type or a guarantee type) of the UEs connected to the DU #1 via the RU. Therefore, when a monitoring alert is received and there is a guarantee type UE, a request to control the service level, that is, that the load of the DU #1 should be distributed to the DU #2, is notified to the management apparatus 100 (see the enclosure indicated by the reference number 1301 in FIG. 10).

Processing distribution of the DU by the management apparatus 100 includes the following operations (see the enclosure indicated by the reference number 1501 in FIG. 10).

The management apparatus 100 instructs the CU 210 to select a fixed percentage portion of data for a guarantee type UE (UE #2) and transmit the selected portion to the DU #2 for processing. Further, an instruction is given to transmit a portion that was not selected from the data to the DU #1 for processing. As described above, this selection can be performed in a resource grid unit from a downlink from the DU #1 to the RU #2.

The management apparatus 100 instructs the DU #1 to select a fixed percentage portion of data for a guarantee type UE (UE #2) in the CU 210 and to process a portion of the data that was not selected at the DU #1.

The management apparatus 100 instructs the DU #2 to select a fixed percentage portion of data for a guarantee type UE (UE #2) in the CU 210 and to process a portion of the data that was selected at the DU #2.

In the above operations, the fixed percentage portion of the data is selected in the CU 210 and transmitted to the DU #2 for processing, and the portion that was not selected is subsequently transmitted to the DU #1 for processing.

However, only rules on how to select a fixed percentage portion of the resource grid in the CU 210 may be notified to the DU #1 and the DU #2. In this case, all the data for the guarantee type UE (UE #2) is transmitted from the CU 210 to both the DU #1 and the DU #2 (without reducing the data by selecting a fixed percentage portion). Then, in accordance with the rules notified to the DU #1 and the DU #2, a fixed percentage portion may be selected in the resource grid to reduce the resource blocks that emit radio waves.

Figure 11:
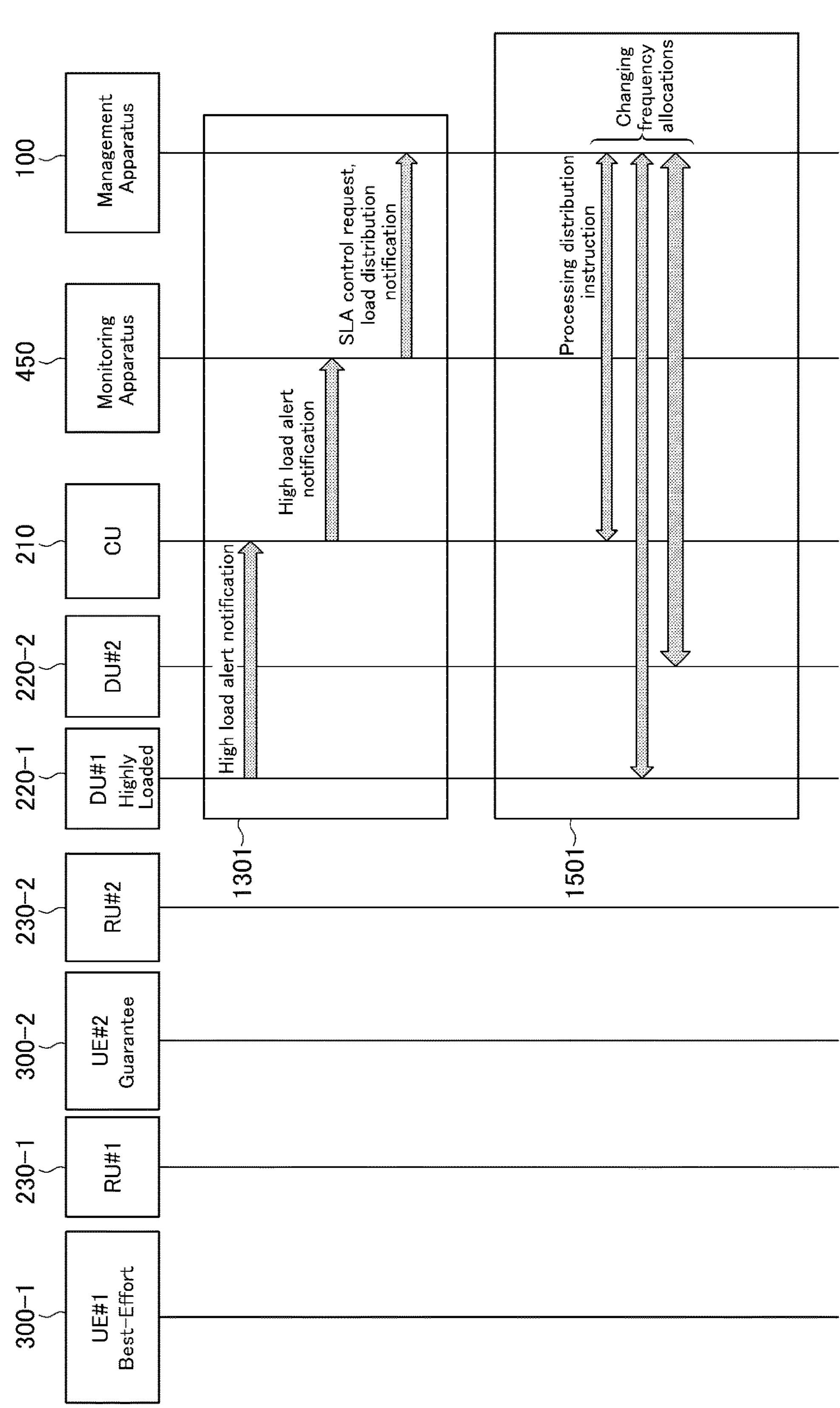
FIG. 11 is a schematic diagram for describing a further example of a procedure of a processing distribution of a DU according to one or more embodiments.

Referring to FIG. 11, a further example of a procedure for a processing distribution of a DU according to one or more embodiments is described. This procedure is a procedure wherein in order to reduce the load on the DU #1, the bands that the DU #1 emits radio waves from the RU #2 are reduced, and the reduced bands are compensated by radio wave emission of the RU #2 from the DU #2.

FIG. 11 shows a management apparatus 100, a monitoring device 450, a CU 210, a DU #1, a DU #2, an RU #1, an RU #2, a UE #1, and a UE #2. The connections and the service levels between them are the same as in FIG. 10, so a description thereof will be omitted.

Moreover, before the procedure of FIG. 11, the procedure up to the processing distribution of the DU (except for the procedure related to the MEC 400 of FIG. 6) being performed, as described with reference to FIG. 6, is the same as in FIG. 10.

The monitoring device 450, which was notified of the high load alert from the DU #1 and the CU 210, requesting to control the service level, that is, notifying the management apparatus 100 that the load of the DU #1 should be distributed to the DU #2, is also the same as in FIG. 10 (see the enclosure indicated by the reference number 1301 in FIG. 11).

Processing distribution of the DU by the management apparatus 100 includes the following operations (see the enclosure indicated by the reference number 1501 in FIG. 11).

For the CU 210, the management apparatus 100 divides the bands that are processed at the DU #1 for the guarantee type UE (UE #2) and that emits radio waves from the RU #2 into two bands, that is, a first band and a second band.

For example, suppose that the bands processed at the DU #1 for the guarantee type UE (UE #2) and emits radio waves from the RU #2 emits radio waves f0 to f1 (unit: Hz) (wherein f0<f1). The bands are divided such that the first band is f0 to f2 (unit: Hz) and the second band is f2 to f1 (unit: Hz) (wherein f0<f2<f1).

The CU 210 transmits the data corresponding to the first band to the DU #1 for processing and transmits the data corresponding to the second band to the DU #2 for processing. The data corresponding to the second band may be transmitted to the DU #1 for processing and the data corresponding to the first band may be transmitted to the DU #2 for processing, and therefore, in such case, necessary changes are made to interpretations as follows.

Again, there follows an example of a case, as illustrated in FIG. 8, in which 80% of the processing is distributed to the DU #2 and the remaining 20% of the processing is performed at the DU #1 for the guarantee type UE #2 in the RU #2.

In such a case, when f2 is selected so that the ratio of a second bandwidth (f2-f1) for the DU #2 to a first bandwidth (f1-f2) for the DU #1 is 80:20, processing distribution by frequency becomes possible.

The data corresponding to the first band may be selected by dividing resource blocks into two in the frequency direction (that is, in the vertical axis direction in FIG. 9) in the resource grid to select the resource blocks for the data to the UE #2.

The management apparatus 100 instructs the DU #1 to select a portion of data corresponding to the second band among data for the guarantee type UE (UE #2) in the CU 210 and to process the selected portion at the DU #1.

The management apparatus 100 instructs the DU #2 to select a portion of data corresponding to the first band among data for the guarantee type UE (UE #2) in the CU 210 and to process the selected portion at the DU #2.

Figure 12:
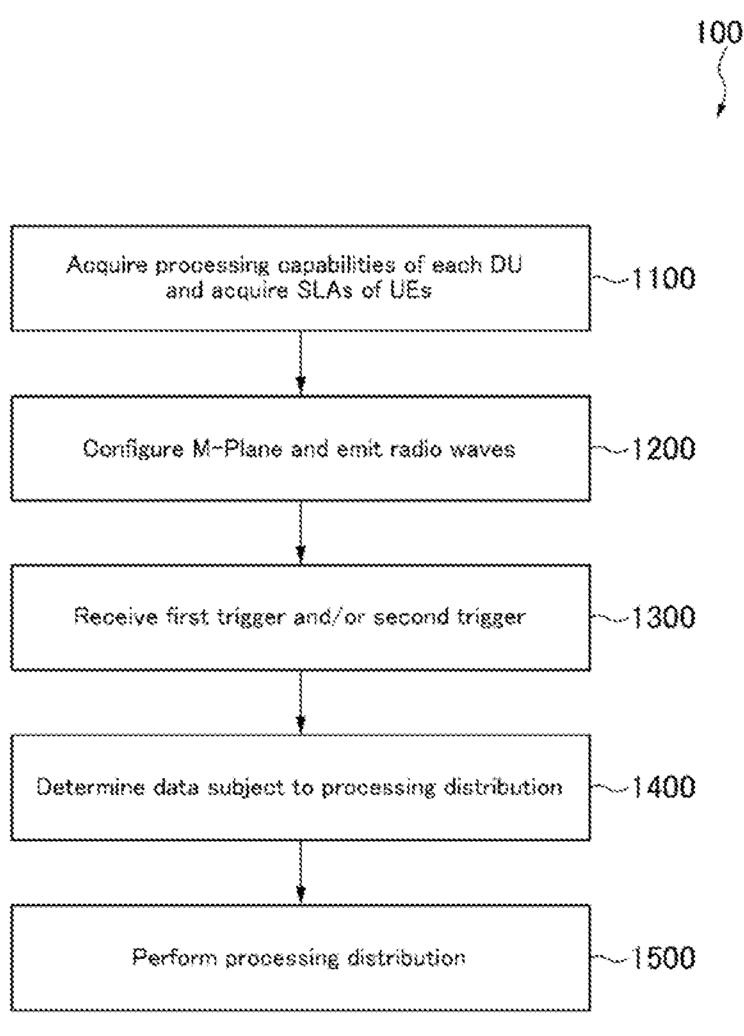
FIG. 12 is a flow chart illustrating an example of a management method of a RAN according to one or more embodiments.

FIG. 12 is a flowchart illustrating an example of a RAN management method 1000 executed by one or more processors according to one or more embodiments.

The management method 1000 is a RAN management method in which one or more RUs are communicably connected to a first DU (DU #1) and a second DU (#2).

At Normal Time, when the processing capacity of the first DU that is processing data for the one or more RUs decreases, a portion of data processing for a guarantee type UE at the first DU is transferred to the second DU, thereby providing a method of distributing data processing.

Note that the present method is anticipated to be executed in the management apparatus 100, but a portion of the processing may be executed by a different apparatus than the management apparatus 100. That is, the present method may be performed by processing distribution with a plurality of devices.

In the management method 1000, processing capabilities of a CU and each DU to each RU, and SLAs of UEs connected thereto (that is, a guarantee type or a best-effort type) are acquired (reference number 1100 in FIG. 12). Note that this step may be repeated periodically. Moreover, information regarding which RU the guarantee type UE is connected to can be acquired.

In addition, for the CU and each DU, processing of data directed to the best-effort type UE and processing of data directed to the guarantee type UE at Normal Time can be configured so as to be performed at the DU #1.

Furthermore, the amount of data being processed at each DU may be acquired from a MEC for each application using the data. As a result thereof, the amount of data being processed at each DU can be monitored for each application.

Next, a M-Plane is configured to emit radio waves from the RUs (reference number 1200 in FIG. 12). The RUs can establish sessions with the DU #1 and the DU #2 to emit radio waves. In Normal Time, RUs are configured to emit radio waves for the data processed at the DU #1.

Next, processing distribution of the DU is initiated upon receiving a first trigger or a second trigger (reference number 1300 in FIG. 12).

The first trigger is a trigger that gives an alert when the DU #1 is highly loaded. In particular, an alert may be given when a resource usage rate of the DU #1 exceeds a predetermined first threshold.

The second trigger is a trigger in which the MEC provides notification of traffic increase. In particular, the MEC may provide notification of an increase in the traffic when the amount of traffic being monitored exceeds a predetermined second threshold.

Processing distribution of the DU may be initiated when either one of the first trigger or the second trigger is applied. Alternatively, processing distribution of the DU may be initiated when both of the first trigger and the second trigger are applied.

Next, among data for the guarantee type UE, data to be processed at the DU #2 is determined (reference number 1400 in FIG. 12).

This determination can be made based on the type of the data for the guarantee type UE. In particular, this determination can be made based on the priority of data for each application.

Alternatively, the data distributed to the DU #2 and to be processed at the DU #2 can be determined to be a fixed percentage of the data for the guarantee type UE.

In particular, this determination can be made based on the number of resource blocks for transmitting data for the guarantee type UE.

Alternatively, this determination can be performed by a fixed percentage of bandwidth within bandwidth that transmits data for the guarantee type UE.

Next, processing distribution is performed (reference number 1500 in FIG. 12).

That is, among the data for the guarantee type UE, the data (or the portion of the data) determined to be processed at the DU #2 is processed at the DU #2.

Moreover, among the data for the guarantee type UE, data (or a portion of data) other than the data (or the portion of the data) determined to be processed at the DU #2 is processed at the DU #1.

Optionally, the MEC may monitor whether the data traffic is normal or not.

Note that the flowchart described above is merely one example, and the order of processing can be changed as appropriate as long as a desired result can be obtained.

The present disclosure also includes a program for causing one or more processors to perform the management methods described above. The program may be stored and provided in a computer-readable non-transitory storage medium.

The program may be stored in a volatile or a non-volatile memory 124 in a processing device 120 of the management apparatus 100 in FIG. 1 in order to operate the processor 122.

Further, the present disclosure is not limited to the embodiments discussed above and includes various modified examples in which components have been added, removed, or replaced with respect to the configurations discussed above. In addition, the embodiments may be combined in various ways.

The term "connection" used in the present description refers to a logical connection for the purpose of communication. For example, "an RU connected to a DU" means that the DU and the RU are logically connected such that communication therebetween is possible. There is no need for the DU and the RU to be directly connected in a physical manner by means of physical cables or the like, and the DU and the RU may be connected via multiple devices or by radio communication.

Further, the present disclosure includes the following aspects.

[1] A management apparatus of a Radio Access Network (RAN) that is shared by a plurality of operators, wherein the RAN comprises:
- a Central Unit (CU);
- a first Distributed Unit (DU) that is communicably connected to the CU;
- a second DU that is communicably connected to the CU; and
- a Radio Unit (RU) that is communicably connected to the first DU and the second DU,
- wherein the management apparatus comprises a processor that executes transmission of instructions to the CU, the first DU, and the second DU to cause the second DU to process, among data to be processed at the first DU for the RU, at least a portion of the data for a specific User Equipment (UE) that is communicably connected to the RU.

[2] The management apparatus of [1], wherein the specific UE is a UE that entered into a guarantee type Service Level Agreement (SLA) with one of the plurality of operators.

[3] The management apparatus of [1] or [2], wherein the instructions are transmitted
- when a resources usage rate of the first DU exceeds a predetermined first threshold, or
- when traffic being monitored in the RAN exceeds a predetermined second threshold.

[4] The management apparatus of any one of [1] to [3], wherein the portion of the data to be processed at the second DU is determined by a type of the data for the specific UE.

[5] The management apparatus of [4], wherein the type of the data for the specific UE is defined for each application.

[6] The management apparatus of any one of [1] to [3], wherein the portion of the data to be processed at the second DU is a fixed percentage portion of the data for the specific UE.

[7] The management apparatus of [6], wherein the fixed percentage portion is selected in resource block units.

[8] A method for managing a Radio Access Network (RAN) that is shared by a plurality of operators, wherein the RAN comprises:
- a Central Unit (CU);
- a first Distributed Unit (DU) that is communicably connected to the CU;
- a second DU that is communicably connected to the CU; and
- a Radio Unit (RU) that is communicably connected to the first DU and the second DU,
- wherein the method comprises,
- instructing the CU, the first DU, and the second DU to cause the second DU to process, among data to be processed at the first DU for the RU, at least a portion of the data for a specific User Equipment (UE) that is communicably connected to the RU.

[9] A radio communication system comprising:
- a Radio Access Network (RAN) that is shared by a plurality of operators, wherein the RAN comprises
- a Central Unit (CU),
- a first Distributed Unit (DU) that is communicably connected to the CU,
- a second DU that is communicably connected to the CU, and
- a Radio Unit (RU) that is communicably connected to the first DU and the second DU; and
- a management apparatus of the RAN,
- wherein the management apparatus comprises a processor that executes instructing the CU, the first DU, and the second DU to cause the second DU to process, among data to be processed at the first DU for the RU, at least a portion of the data for a specific User Equipment (UE) that is communicably connected to the RU.

REFERENCE SIGNS LIST

100 Management apparatus
110 Transmission/reception unit
120 Processing device
122 Processor
124 Memory
126 Storage
200 RAN
210 CU
220, 220-1, 220-2 DU
230, 230-1, 230-2, 230-3, 230-4, 230-5, 230-6 RU
300-1, 300-2, 300-3 UE
400 MEC
450 Monitoring apparatus
500 CN
931, 932, 933 Data
1000 Management method

The invention claimed is:

1. A management apparatus of a Radio Access Network (RAN) that is shared by a plurality of operators, wherein the RAN comprises:

a Central Unit (CU);

a first Distributed Unit (DU) that is communicably connected to the CU;

a second DU that is communicably connected to the CU; and a Radio Unit (RU) that is communicably connected to the first DU and the second DU, and to a plurality of User Equipment (UE), the RU being configured to process data for the plurality of UE, each of the plurality of UE being in one of a guarantee type Service Level Agreement (SLA) or a best-effort type SLA with one of a plurality of operators, wherein the management apparatus comprises a processor that executes transmission of instructions to the CU, the first DU, and the second DU to:

acquire the SLA of the plurality of UE;

among the plurality of UE, identify a first UE as being in the guarantee type SLA, and a second UE as being in the best-effort type SLA;

cause the first DU to process first data for the RU and second data for the RU, the first data being for the first UE and the second data being for the second UE; and while the first DU processes the first data for the RU for the first UE and the second data for the RU for the second UE, cause the second DU to process only a portion of the first data for the first UE, among the first data and the second data being processed at the first DU.

2. The management apparatus according to claim 1, wherein the instructions are transmitted when a resources usage rate of the first DU exceeds a predetermined first threshold, or when traffic being monitored in the RAN exceeds a predetermined second threshold.

3. The management apparatus according to claim 1, wherein the portion of the first data to be processed at the second DU is determined by a type of the first data for the first UE.

4. The management apparatus according to claim 3, wherein the type of the first data for the first UE is defined for each application.

5. The management apparatus according to claim 1, wherein the portion of the first data to be processed at the second DU is a fixed percentage portion of the first data for the first UE.

6. The management apparatus according to claim 5, wherein the fixed percentage portion is selected in resource block units.

7. A method for managing a Radio Access Network (RAN) that is shared by a plurality of operators, the method comprising:

providing the RAN, wherein the RAN comprises:

a Central Unit (CU), a first Distributed Unit (DU) that is communicably connected to the CU, a second DU that is communicably connected to the CU, and a Radio Unit (RU) that is communicably connected to the first DU and the second DU, and to a plurality of User Equipment (UE), the RU being configured to process data for the plurality of UE, each of the plurality of UE being in one of a guarantee type Service Level Agreement (SLA) or a best-effort type SLA with one of a plurality of operators; and instructing the CU, the first DU, and the second DU to:

acquire the SLA of the plurality of UE;

among the plurality of UE, identify a first UE as being in the guarantee type SLA, and a second UE as being in the best-effort type SLA;

cause the first DU to process first data for the RU and second data for the RU, the first data being for the first UE and the second data being for the second UE; and while the first DU processes the first data for the RU for the first UE and the second data for the RU for the second UE, cause the second DU to process only a portion of the first data for the first UE, among the first data and the second data being processed at the first DU.

8. A radio communication system comprising:

a Radio Access Network (RAN) that is shared by a plurality of operators, wherein the RAN comprises a Central Unit (CU), a first Distributed Unit (DU) that is communicably connected to the CU, a second DU that is communicably connected to the CU, and a Radio Unit (RU) that is communicably connected to the first DU and the second DU, and to a plurality of User Equipment (UE), the RU being configured to process data for the plurality of UE, each of the plurality of UE being in one of a guarantee type Service Level Agreement (SLA) or a best-effort type SLA with one of a plurality of operators; and a management apparatus of the RAN, wherein the management apparatus comprises a processor that executes instructing the CU, the first DU, and the second DU to:

acquire the SLA of the plurality of UE;

among the plurality of UE, identify a first UE as being in the guarantee type SLA, and a second UE as being in the best-effort type SLA;

cause the first DU to process first data for the RU and second data for the RU, the first data being for the first UE and the second data being for the second UE; and while the first DU processes the first data for the RU for the first UE and the second data for the RU for the second UE, cause the second DU to process only a portion of the first data for the first UE, among the first data and the second data being processed at the first DU.

* * * * *